Patented May 24, 1927.

1,629,512

UNITED STATES PATENT OFFICE.

FRITZ KÜNDIG, OF WALLISELLEN, NEAR ZURICH, SWITZERLAND.

PROCESS FOR THE PRODUCTION OF COFFEE FREE FROM CAFFEINE.

No Drawing. Application filed May 1, 1925, Serial No. 27,318, and in Switzerland May 6, 1924.

Up to the present coffee free from caffeine was only produced by means of extraction apparatus.

The new process is adapted to withdraw caffeine from whole coffee beans by the employment of a pressure of about 15 atmospheres for example in an autoclave with the assistance of a solvent, such as a hydrocarbon for example benzene, toluol, carbon tetrachloride. Any one of the substances of this hydrocarbon group can be used. The caffeine may also be withdrawn from the coffee beans under high pressure by means of ketones for example diethylketone, mesityloxide, as also the whole group of ketones. Further the caffeine may also be withdrawn under high pressure by means of alcohols, for example, allylalcohol, propylalcohol, as also the whole group of alcohols.

The withdrawal of caffeine by means of hydrocarbons, ketones, or alcohols can be effected with or without the addition of substances having an alkaline action under pressure, for example, without any addition or also with the addition of any substance having an alkaline action such as soda lye, potash lye, lime, and so on.

The withdrawal of the caffeine can also be effected by treating the coffee beans whilst whole with certain organic acids or compounds of acids. For example it is possible to use salicylic acid, nitric acid or their esters and ether separately or in combination. The acids are heated together with the coffee beans under high pressure, whereby the caffeine escapes.

The novelty resides therein that caffeine can be withdrawn from the whole coffee beans under high pressure with or without the addition of substances having an alkaline action by means of hydrocarbons (except benzole), or also by means of ketones or alcohols in high or low percentage qualities.

What I wish to secure by U. S. Letters Patent is:—

1. Process for the production of coffee free from caffeine, consisting in subjecting whole coffee beans to a pressure of about 15 atmospheres in the presence of a solvent for caffeine.

2. Process for the production of coffee free from caffeine, consisting in subjecting whole coffee beans to a pressure of about 15 atmospheres in the presence of a hydrocarbon solvent for caffeine.

In witness whereof I affix my signature.

FRITZ KÜNDIG.